United States Patent Office 2,862,940
Patented Dec. 2, 1958

2,862,940

PROCESS FOR THE PRODUCTION OF OMEGA-AMINO ACIDS

Hiroshi Otsuki and Hideya Funahashi, Tokyo-to, Japan

No Drawing. Application November 24, 1953
Serial No. 394,204

Claims priority, application Japan November 27, 1952

4 Claims. (Cl. 260—404)

This invention relates to a process for the production of ω-amino acid and its esters from a starting substance selected from unsaturated fatty acids and its esters which are easily obtainable.

ω-Amino acid and its esters are broadly employed as the starting substances for the production of polyamid.

For the purpose of producing said ω-amino acid, heretofore, the following processes have been chiefly employed.

(1) Cyclic ketone→oxime→lactam→ω-amino acid.
(2) Dinitrile→aminonitrile→ω-amino acid. Amic acid is a compound having the general formula ($HOOC-R-CONH_2$) and is found in various literature, for example, D. D. Coffman et al.: J. Poly Sc., 3, 85 (1948), page 87, line 9, from bottom of page, page 93, line 20.
(3) Dicarboxylic acid→polyanhydride→amic acid→N·carbomethoxyamino acid→ω-amino acid.
(4) ω-Unsaturated acid→ω-bromo acid→ω-amino acid.

Said processes heretofore in use require considerable complex reactions, so that it is impossible to produce economically and cheaply ω-amino acid.

Therefore, the principal object of this invention is to provide a process capable of industrially and cheaply producing ω-amino acid with simple and effective reaction operations.

According to this invention, the aforesaid object and other objects of this invention have been accomplished by a process which comprises converting an unsaturated fatty acid or its esters into an ozonide by passing ozone therethrough, subjecting said converted product to a decomposition and converting the aldehyde radical of the acid aldehyde or the derivative thereof which has been produced by said decomposition into methylene amino radical. In the embodiment of said process, the mixture of an unsaturated fatty acid and other unsaturated or saturated fatty acid or acids may be employed as the starting substance and also the starting substance may be, if necessary, subjected to an ozonization together with a suitable solvent.

It is well-known that if the ozonide prepared by converting an unsaturated fatty acid by means of passing ozone therethrough is subjected to a decomposition, then aliphatic aldehyde, acid aldehyde and other by-products such as lower fatty acid, dibasic acid, etc., said by-products being oxides of said aldehyde and acid aldehyde, will be produced. On the other hand, it is also well-known that if said unsaturated fatty acid contains two or more unsaturated bonds, dialdehyde will be produced besides the above-said products. In the above reactions, when said decomposition is carried out in the presence of a reducing agent, it is possible to stop the reaction at a time when only the aldehydes would be quantitatively produced.

When said acid aldehyde is subjected to a reduction after conversion thereof to aldoximes by the addition of hydroxyamine or at a high pressure and in the presence of a catalyser of the nickel group by introducing hydrogen therethrough after addition of ammonia therein, the aldehyde radical will be readily converted into methyleneamino radical resulting in production of ω-amino acid.

This invention is based on the reactions as described above.

According to this invention, it has been found that the following combination of reaction processes provides a very excellent and industrial process for the production of ω-amino acid suitable for the starting substance of polyamid.

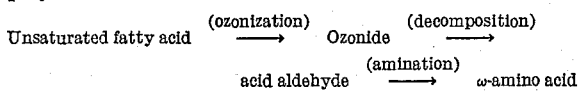

Heretofore, employment of ozone for the industrial production of ω-amino-acid had not yet been adopted. This fact seems to be due to difficulty in the industrial generation of ozone.

The inventors of this invention have succeeded in manufacturing an industrial ozone-generator high in efficiency and low in consumptive electric-power.

Therefore, according to this invention, it has become possible to produce ω-amino acid industrially, cheaply and with good yield from acid aldehyde or its esters which have been prepared from unsaturated fatty acid or its esters by employing ozone. Such process is new, not heretofore having been known.

In the embodiment of this invention, the following processes may be employed for producing said acid aldehyde by ozonization of unsaturated fatty acid.

(a) A process which comprises subjecting the ozonide of unsaturated fatty acid to a decomposition by means of heating only.

(b) A process which comprises passing ozone through the aqueous solution of sodium salt of unsaturated fatty acid, whereby ozonide is produced and also decomposition takes place.

In either of the above cases, acid aldehyde and aliphatic aldehyde will be produced together with dibasic acid and lower fatty acids.

The aforesaid latter by-products may be effectively employed for various objects, but for the purpose of producing the acid aldehyde with good yield it is preferable to adopt the decomposition due to a reduction. For instance, if the decomposition of the ozonide of unsaturated fatty acid is carried out by placing it into an aqueous solution of sodium sulphite while steam is passed into said solution, aliphatic aldehyde (dialdehyde in case of employing the unsaturated fatty acid having two or more unsaturated bonds) will be distilled out together with steam and only the acid aldehyde remains. The chemical formula of said reaction is as follows:

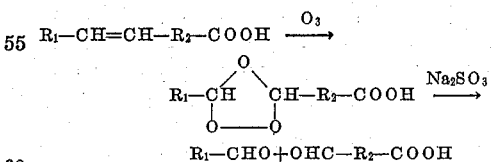

$$R_1-CHO + OHC-R_2-COOH$$

wherein $R_1$ represents $CH_3-(CH_2)_n-$ and $R_2$ represents $-(CH_2)_m-$.

ω-Amino acid will be produced by subjecting the aldehyde ammonia to a reduction with hydrogen at a high pressure and in the presence of Raney nickel, said aldehyde ammonia being prepared by adding a suitable amount of ammonia in the acid aldehyde produced as above or by subjecting the oxime to a reduction with a suitable reducing agent such as aluminum amalgam, said oxime being a deposit produced by the addition of hydroxyamine in an aqueous solution of sodium salt of the acid aldehyde produced as above.

The chemical formulas of said reactions are as follows:

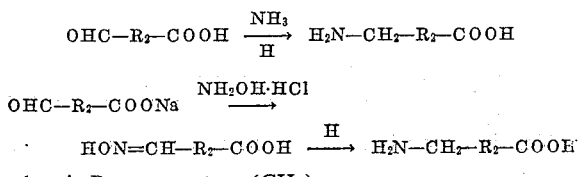

wherein $R_2$ represents $-(CH_2)_m-$.

As the starting substance, not only an individual unsaturated fatty acid, but also the mixture of several kinds of fatty acids prepared by decomposition of usual oils and fats may be employed. For instance even if the mixture of oleic acid, linoleic acid and linolenic acid is employed as the starting substance, 9-aminononylic acid may be produced.

In the reaction process according to this invention, although saturated fatty acids are contained in the decomposition product of usual oils and fats, said saturated fatty acids contained would not be affected by ozone and will separate, so that the by-products which are similar to the saturated fatty acid prepared by catalytic hydogenation of the unsaturated fatty acid will be obtained.

In the following, various examples of carrying out the invention will be explained.

Example 1

1 kg. of oleic acid was neutralized with the equivalent mol of caustic soda and 15% aqueous solution thereof was prepared. Through said solution was passed an amount of ozone more than the equivalent mol at a temperature of from 30° C. to 40° C. and the oil layer was separated after cooling, in said oil layer being contained nonyl aldehyde and nonylic acid as the by-products. In the water layer of said product was added the aqueous solution prepared by adding 160 g. of hydroxyamine hydrochloride into 160 cc. of water.

By adjusting the pH value of said product to 4.5 by the addition of sulphuric acid, a precipitate of azelaic acid aldoxime was obtained.

By filtrating said precipitate there was obtained a crystalline white powder, the melting point and yield thereof being 109° C. and 300 g., respectively. By lowering the pH value of said filtrate azelaic acid was obtained as the by-product. 300 g. of the oxime was dissolved in 900 cc. of methanol. In this solution was added the catalyser which had been prepared by washing 290 g. of aluminum scrap with 10% aqueous solution of caustic soda and subjecting the surfaces of said washed scrap to an amalgamation containing 0.5% solution of mercuric chloride. Said mixture was subjected to a reaction at room temperature by placing water therein.

After said reaction, the methanol was distilled out and the remainder was evaporated after extraction by water, whereby 209 g. of crystalline 9-aminononylic acid was obtained, the melting point of the hydrochloride of said product being from 115° C. to 118° C. By heating said 9-aminononylic acid, the polyamide having a spinning character and a melting point of 195° C., was obtained.

Example 2

1 kg. of oleic acid was converted into an oleic acid ozonide by passing ozone more than the equivalent mol through the former at a temperature of from 35° C. to 40° C. By putting said ozonide into a container maintained at a reduced pressure below 10 mm. and at a temperature of about 100° C. or into a container, through which was passed blown steam, nonyl aldehyde was distilled out due to decomposition. From the remainder, azelaic acid and azelaic acid aldehyde were extracted as a form of sodium salt by shaking said remainder after the addition of a 10% aqueous solution of sodium carbonate, and nonyl acid was separated off.

By treating the aqueous solution of the sodium salt of said product in the same manner as in Example 1, 28 g. of 9-aminononylic acid and azelaic acid were obtained.

Example 3

1 kg. of oleic acid was coverted into oleic acid ozonide in the same manner as in Example 2. When said product was placed into 500 g. of sodium sulphite through which steam was passed, 420 g. of nonyl aldehyde was distilled out and 570 g. of the remainder containing azelaic acid aldehyde as the main constituent was obtained. Into said remainder, after washing with water and dehydration thereof, was added 150 g. of liquid ammonia, 1200 g. of absolute alcohol and 15 g. of Raney nickel. Said mixture was subjected to a reduction at a temperature of 90° C. in the presence of hydrogen at the pressure of 1800 lbs. per square inch for three hours. By extracting said product reduced as above, after recovery of the excessive ammonia and alcohol with 10% hydrochloric acid, 9-aminononylic acid hydrochloride was obtained. When said hydrochloride, after neutralization thereof, was extracted by butanol, 480 g. of 9-aminononylic acid was obtained.

Example 4

A solution of oleic acid azonide was produced by adding 1 kg. of mineral terpentine into 1 kg. of oleic acid and subjecting said mixture to ozonization at a temperature of from 10° C. to 15° C.

When said solution was poured under stirring into 45 kg. (about 3 mols) of 33% aqueous solution of sodium hydrogen sulphite and was heated at a temperature of about 50° C., the aldehydes and sodium hydrogen sulphite dissolved in the water layer as additional compounds

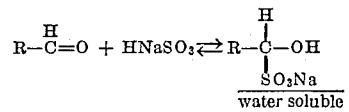

and, on the other hand, the mineral terpentine containing small amounts of saturated fatty acids and unreacted oleic acid under the condition dissolved therein, floated on the upper layer. By adding 830 g. of 60% sulphuric acid into said product after separation of the water layer thereof and subjecting it to steam distillation, nonyl aldehyde was distilled out and azelaic acid aldehyde floated on the residual water layer.

By treating said azelaic acid aldehyde in the same manner as in Example 3, 465 g. of 9-aminononylic acid was obtained.

Example 5

Ethyl ester produced from 1 kg. of oleic acid was converted into ozonide by passing slightly excessive ozone therethrough at a temperature of from 25° C. to 30° C.

The aforesaid ozonide was treated in the same manner as in Example 3 and 520 g. of 9-aminononylic acid ethyl ester was obtained. These esters were easily distilled out at a temperature of from 115° C. to 120° C. and at a reduced pressure of about 2 mm. On the other hand, said esters were readily split off of the alcohol by heating at a temperature above 200° C. in the presence of nitrogen gas and were polycondensated, whereby polyamide having a spinning character was obtained.

Example 6

By treating 1 kg. of oleic acid in the same manner as the Example 4, azelaic acid aldehyde was obtained. When the aqueous solution of sodium salt of said product was extracted by benzin after addition of 1 mol of diethyl sulphuric acid, 605 g. of azelic acid aldehyde ethyl ester was obtained. 510 g. of 9-aminononylic acid ethyl ester was obtained by subjecting said ethyl ester to a catalytic reduction after addition of ammonia in the same manner as the Example 3.

*Example 7*

By treating undecyclenic acid in the same manner as in Examples 1, 2, 3 or 4, 10-amino capric acid, the melting point thereof being from 187° C. to 188° C., was obtained.

When said product was subjected to a polycondensation under heated condition, polyamide having a spinning character and a melting point of from 170° C. to 172° C. was obtained.

*Example 8*

By treating undecyclenic acid in the same manner as in Examples 5 or 6, 10-amino capric acid ethyl ester was obtained.

*Example 9*

By treating erucic acid in the same manner as in Examples 1, 2, 3 or 4, 13-amino tridecanoic acid of a melting point from 161° C. to 163° C. and hydrochloride of a melting point of from 130° C. to 132° C. were obtained. By subjecting said products to a polycondensation under heated condition, polyamide of a melting point of from 175° C. to 177° C. and having spinning character was obtained.

*Example 10*

By treating erucic acid in the same manner as in Example 5 or 6, 13-amino tridecanoic acid ethyl ester was obtained.

*Example 11*

By treating fatty acid prepared by decomposition of whale oil in the same manner as in Example 3 or 4, 9-aminononylic acid and by-products such as nonyl aldehyde, nonyl acid, azelaic acid and long chain saturated fatty acid containing $C_{16}$ as the main constituent were obtained.

*Example 12*

By treating the fatty acid prepared by decomposition of whale oil in the same manner as in Example 3 or 4, 9-aminononylic acid and the by-products, such as nonyl aldehyde and long chain saturated fatty acid containing $C_{16}$ as the main constituent, were obtained.

*Example 13*

By treating the fatty acid prepared by decomposition of beef tallow in the same manner as in Example 3 or 4, 9-aminononylic acid and the by-products such as nonyl aldehyde, a long chain fatty acid containing $C_{16}$, $C_{18}$ as the main constituents, a small amount of capric aldehyde and malonic-dialdehyde, were obtained.

It is obvious that many changes and modifications can be made in the above-mentioned details without departing from the nature and spirit of the invention.

We claim:

1. In a process for the production of ω-amino acid, the synthetic combination of the steps of converting a starting substance selected from the group of unsaturated fatty acids into ozonide by introducing ozone therethrough, subjecting said ozonide to a decomposition, said decomposition of the ozonide being carried out by steam distillation, converting the acid aldehyde derived from said decomposition of said ozonide to aldehyde ammonia by addition of ammonia and then reducing said converted aldehyde ammonia by catalytic hydrogenation in the presence of Raney nickel to obtain a product of the group of ω-amino acid as the final product.

2. In a process for the production of ω-amino acid, the synthetic combination of the steps of converting a starting substance selected from the group of unsaturated fatty acids into ozonide by introducing ozone therethrough, subjecting said ozonide to a decomposition, said decomposition of the ozonide being carried out by steam distillation in the presence of sodium sulphite, converting the acid aldehyde derived from said decomposition of said ozonide to aldehyde ammonia by addition of ammonia and then reducing said converted aldehyde ammonia by catalytic hydrogenation in the presence of Raney nickel to obtain a product of the group of ω-amino acid as the final product.

3. In a process for the production of ω-amino acid, the synthetic combination of the steps of converting a starting substance selected from the group of unsaturated fatty acids into ozonide by introducing ozone therethrough, subjecting said ozonide to a decomposition, said decomposition of the ozonide being carried out by an aqueous solution of sodium hydrogen sulphite, converting the acid aldehyde derived from said decomposition of said ozonide to aldehyde ammonia by addition of ammonia and then reducing said converted aldehyde ammonia by catalytic hydrogenation in the presence of Raney nickel to obtain a product of the group of ω-amino acid as the final product.

4. In a process for the production of ω-amino acid, the synthetic combination of the steps of converting a starting substance selected from the group of unsaturated fatty acids into ozonide by introducing ozone therethrough, subjecting said ozonide to a decomposition, converting the acid aldehyde derived from said decomposition of said ozonide by addition of hydroxyamine to aldoxime, and then reducing said aldoxine by aluminum amalgam to obtain a product of the group of ω-amino acid as the final product.

References Cited in the file of this patent

UNITED STATES PATENTS 2,610,212  Floyd _____ Sept. 9, 1952

OTHER REFERENCES

Fatty Acids, by K. S. Markley, copyright 1947, pages 424–428.

Ralston: Fatty Acids and Their Derivatives, 1948, pages 418–420, 816, 934.

Organic Reactions, edited by Adams et al., copyright 1948, page 176.

Synthetic Organic Chemistry, by R. B. Wagner and H. I. Zook, copyright 1953, page 658.

Winans et al.: J. A. C. S., 55, pages 2051–2058.

Henne et al., J. A. C. S., 65, pages 752–755.

Henne et al.: J. A. C. S., 65, pages 2183–2185.